US012802174B2

(12) United States Patent
Zhu et al.

(10) Patent No.: US 12,802,174 B2
(45) Date of Patent: Nov. 17, 2026

(54) IMAGE GENERATION METHOD BASED ON BROWNIAN BRIDGE DIFFUSION MODEL, DEVICE AND MEDIUM

(71) Applicant: SHENZHEN UNIVERSITY, Shenzhen (CN)

(72) Inventors: Yingying Zhu, Shenzhen (CN); Qingwang Zhang, Shenzhen (CN); Rui Mao, Shenzhen (CN)

(73) Assignee: SHENZHEN UNIVERSITY, Shenzhen (CN)

( * ) Notice: Subject to any disclaimer, the term of this patent is extended or adjusted under 35 U.S.C. 154(b) by 153 days.

(21) Appl. No.: 18/963,744

(22) Filed: Nov. 28, 2024

(65) Prior Publication Data

US 2026/0087592 A1 Mar. 26, 2026

(30) Foreign Application Priority Data

Sep. 24, 2024 (CN) ......................... 202411333930.9

(51) Int. Cl.
*G06T 5/50* (2006.01)
*G06T 5/70* (2024.01)
(Continued)

(52) U.S. Cl.
CPC .................. *G06T 5/50* (2013.01); *G06T 5/70* (2024.01); *G06T 9/00* (2013.01); *G06V 10/44* (2022.01);
(Continued)

(58) Field of Classification Search
CPC .... G06T 5/50; G06T 5/70; G06T 9/00; G06T 2207/20084; G06T 2207/20221;
(Continued)

(56) References Cited

U.S. PATENT DOCUMENTS

2024/0303860 A1 * 9/2024 Mithun ...................... G06T 7/74

FOREIGN PATENT DOCUMENTS

CN 118887309 A * 11/2024 ............. G06N 3/094

OTHER PUBLICATIONS

Li, Bo, et al. "Bbdm: Image-to-image translation with brownian bridge diffusion models."Â Proceedings of the IEEE/CVF conference on computer vision and pattern Recognition. 2023 (Year: 2023).*

* cited by examiner

*Primary Examiner* — Said Broome
*Assistant Examiner* — Jordan Wan Yick

(57) ABSTRACT

The present application relates to an image generation method and apparatus based on a Brownian bridge diffusion model, a device and a medium, wherein the method includes: receiving an image combination including a satellite image and a ground panoramic image; extracting shared features of the satellite image and the ground panoramic image; performing a polar coordinate transformation on the satellite image to obtain an initial latent vector of the satellite image and a latent vector of the ground panoramic image; gradually adding noise into the latent vector of the ground panoramic image to obtain a latent vector of the satellite image; gradually removing the noise in the latent vector of the satellite image to generate a target latent vector; and decoding the target latent vector to generate a target ground panoramic image. The efficiency and quality of conversion from the satellite image to the ground panoramic image are improved.

17 Claims, 3 Drawing Sheets

(51) Int. Cl.
*G06T 9/00* (2006.01)
*G06V 10/44* (2022.01)
*G06V 20/13* (2022.01)

(52) U.S. Cl.
CPC .... *G06V 20/13* (2022.01); *G06T 2207/20084* (2013.01); *G06T 2207/20221* (2013.01)

(58) Field of Classification Search
CPC . G06T 2207/10032; G06T 5/60; G06V 10/44; G06V 20/13; Y02T 10/40; H04N 23/698; H04N 7/20; H04N 23/81
See application file for complete search history.

IMAGE GENERATION METHOD BASED ON BROWNIAN BRIDGE DIFFUSION MODEL, DEVICE AND MEDIUM

CROSS REFERENCES TO RELATED APPLICATION

The present application claims the benefit of Chinese Patent Application No. 202411333930.9 filed on Sep. 24, 2024, the contents of which are incorporated herein by reference in their entirety.

TECHNICAL FIELD

The present application relates to the technical field of artificial intelligence, in particular to an image generation method and apparatus based on a Brownian bridge diffusion model, a device and a medium.

BACKGROUND ART

With the rapid development of a remote sensing technology, satellite images have become an important tool for us to understand and monitor the earth. However, directly-acquired satellite images are often limited by various factors such as resolutions, viewing angles and illumination conditions so as to be difficult to directly use as ground panoramic images. Therefore, an existing satellite image to ground panoramic image generation method has become an important research field.

The existing satellite image to ground panoramic image generation method often relies on additional ground image information (such as a semantic segmentation map and a depth map) for training or reasoning, which does not conform to real application scenarios; moreover, the existing method has the problem of training instability, and parameters and complex network structure design need to be carefully adjusted to maintain the balance of a training process. Therefore, the efficiency and quality of the existing method for conversion from a satellite image to a ground panoramic image are lower.

SUMMARY OF THE INVENTION

Objects of embodiments of the present application are to provide an image generation method and apparatus based on a Brownian bridge diffusion model, a device and a medium so as to improve the efficiency and quality of conversion from a satellite image to a ground panoramic image.

In order to solve the above-mentioned technical problems, an embodiment of the present application provides an image generation method based on a Brownian bridge diffusion model, including:

- receiving a set of image combination, wherein the image combination includes a satellite image and a ground panoramic image corresponding to the satellite image;
- extracting shared features of the satellite image and the ground panoramic image by means of a cross-view image joint encoder;
- performing a polar coordinate transformation on the satellite image, and encoding the satellite image subjected to the polar coordinate transformation and the ground panoramic image to a latent space to obtain an initial latent vector of the satellite image and a latent vector of the ground panoramic image;
- in the latent space, performing a Brownian bridge forward process based on the initial latent vector of the satellite image and the latent vector of the ground panoramic image to gradually add noise into the latent vector of the ground panoramic image to obtain a latent vector of the satellite image;
- performing a Brownian bridge reverse process based on the latent vector of the satellite image and the shared features to gradually remove the noise in the latent vector of the satellite image to generate a target latent vector; and
- decoding the target latent vector to generate a target ground panoramic image.

In order to solve the above-mentioned technical problems, a technical solution adopted in the present application is that: provided is a computer device, including one or more processors; and a memory used for storing one or more programs, so that the one or more processors implement the image generation method based on the Brownian bridge diffusion model of any one described above.

In order to solve the above-mentioned technical problems, a technical solution adopted in the present application is that: provided is a computer-readable storage medium, wherein the computer-readable storage medium has a computer program stored thereon, and the computer program, when executed by a processor, implements the image generation method based on the Brownian bridge diffusion model of any one described above.

Embodiments of the present invention provide an image generation method and apparatus based on a Brownian bridge diffusion model, a device and a medium. The method includes: receiving a set of image combination, wherein the image combination includes a satellite image and a ground panoramic image corresponding to the satellite image; extracting shared features of the satellite image and the ground panoramic image by means of a cross-view image joint encoder; performing a polar coordinate transformation on the satellite image, and encoding the satellite image subjected to the polar coordinate transformation and the ground panoramic image to a latent space to obtain an initial latent vector of the satellite image and a latent vector of the ground panoramic image; in the latent space, performing a Brownian bridge forward process based on the initial latent vector of the satellite image and the latent vector of the ground panoramic image to gradually add noise into the latent vector of the ground panoramic image to obtain a latent vector of the satellite image; performing a Brownian bridge reverse process based on the latent vector of the satellite image and the shared features to gradually remove the noise in the latent vector of the satellite image to generate a target latent vector; and decoding the target latent vector to generate a target ground panoramic image. In the embodiment of the present invention, the shared features of the satellite image and the ground panoramic image are extracted by means of the cross-view image joint encoder, and the Brownian bridge forward process and the Brownian bridge reverse process are performed, at the same time, the shared features are injected to the Brownian bridge reverse process, which is beneficial to the generation of the ground panoramic image with rich details and an accurate structure from the satellite image, and improves the fidelity and semantic consistency of the images. Moreover, in the embodiment of the present application, the Brownian bridge forward process and the Brownian bridge reverse process are further performed in the latent space, which reduces the model training and reasoning costs and increases the image conversion efficiency.

BRIEF DESCRIPTION OF THE DRAWINGS

In order to describe the solutions in the present application more clearly, the accompanying drawings required for describing the embodiments of the present application will be briefly introduced below. Apparently, the accompanying drawings in the following description show only some embodiments of the present application, and those of ordinary skill in the art can still derive other accompanying drawings from these accompanying drawings without creative efforts.

DETAILED DESCRIPTION OF THE INVENTION

Unless defined otherwise, all technical and scientific terms used herein have the same meaning as commonly understood by the skilled in the art to which the present application belongs. Herein, the terms used in the description of the present application are only for the purpose of describing specific embodiments, rather than to limit the present application. Terms "include", "provided with" and any variants thereof involved in the description and claims of the present application and the above-mentioned brief description of the drawings are intended to cover non-exclusive inclusion. Terms such as "first" and "second" in the description and claims of the present application and the above-mentioned accompanying drawings are intended to distinguish different objects, rather than to describe specific orders.

"Embodiments" mentioned herein means that specific features, structures or characteristics described in conjunction with the embodiments can be included in at least one of the embodiments of the present application. The occurrence of this phrase at each position in the description does not necessarily mean the same embodiment or an independent or alternative embodiment mutually exclusive with other embodiments. It is explicitly and implicitly understood by the skilled in the art that the embodiments described herein can be combined with other embodiments.

In order to make the skilled in the art better understand the solutions of the present application, the technical solutions in the embodiments of the present application will be described clearly and completely below in conjunction with the accompanying drawings.

The present application will be described below in detail in conjunction with the accompanying drawings and implementations.

It should be noted that an image generation method based on a Brownian bridge diffusion model provided in an embodiment of the present application is generally performed by a server, and accordingly, an image generation apparatus based on a Brownian bridge diffusion model is disposed in the server.

Figure 1:
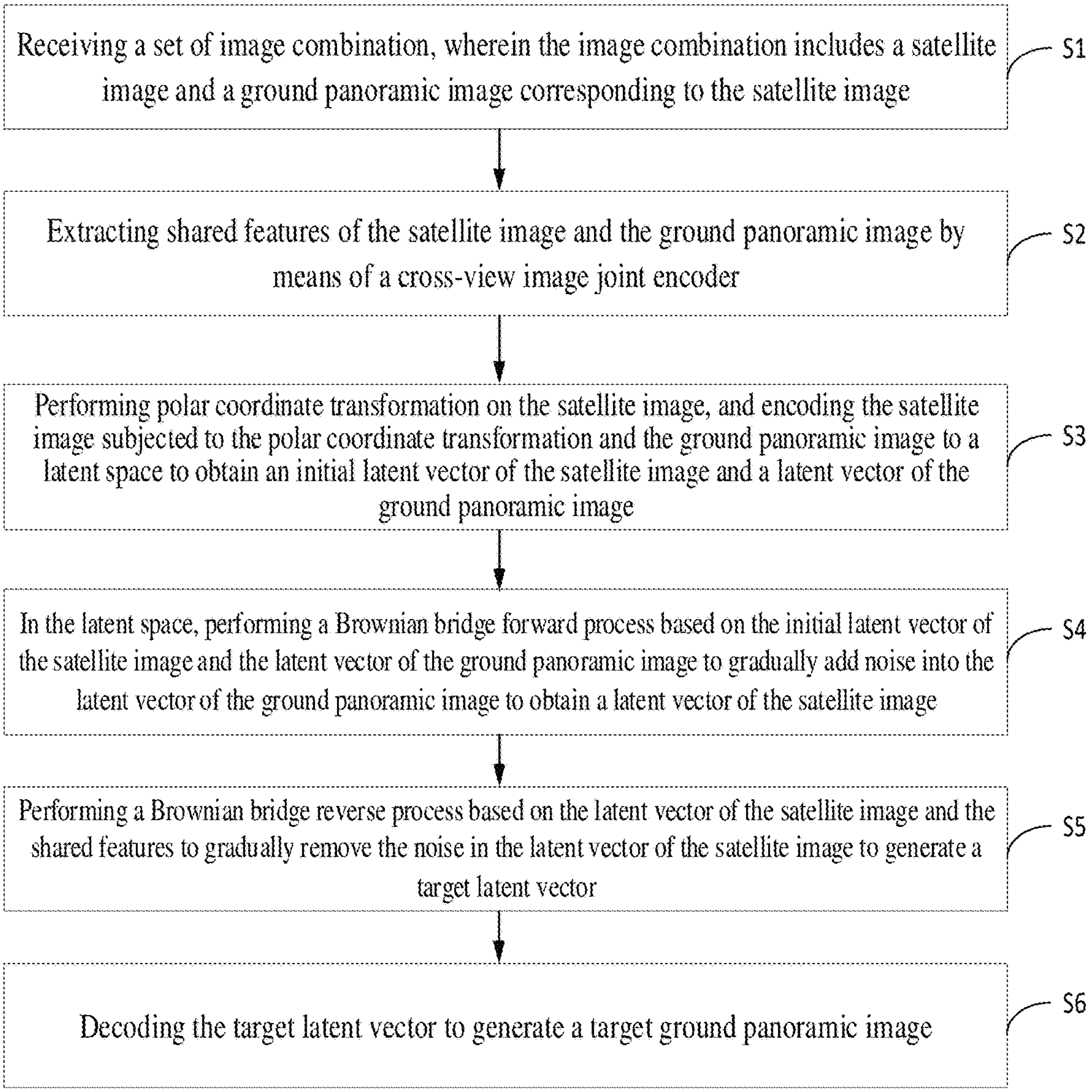
FIG. 1 is an implementation process diagram of a process of an image generation method based on a Brownian bridge diffusion model provided in an embodiment of the present application.

Refer to FIG. 1, which shows a specific implementation of an image generation method based on a Brownian bridge diffusion model.

It should be noted that if there are results which are essentially the same, the method provided in the present invention is not limited to be performed in a process order shown in FIG. 1. The method includes the following steps:

- S1: a set of image combination is received, wherein the image combination includes a satellite image and a ground panoramic image corresponding to the satellite image.

An embodiment of the present application provides an image generation method based on a Brownian bridge diffusion model, which is used for converting a satellite image into a ground panoramic image and improves the image conversion efficiency and quality. Moreover, the embodiment of the present application has a wide application prospect in various fields including, but not limited to wide-area virtual environment modeling, augmented reality content creation, 3D game development, advanced simulation training and cross-view image matching. In the embodiment of the present application, a set of image combination is acquired, wherein the image combination includes a satellite image and a ground panoramic image corresponding to the satellite image.

- S2: shared features of the satellite image and the ground panoramic image are extracted by means of a cross-view image joint encoder.

Specifically, the shared features of the satellite image and the ground panoramic image are extracted by means of the cross-view image joint encoder, and the shared features are embedded into shared feature space so as to provide feature information for a subsequent diffusion model. The cross-view image joint encoder is an encoder generated by training by means of comparative learning and is used for extracting shared features of cross-view images.

Figure 2:
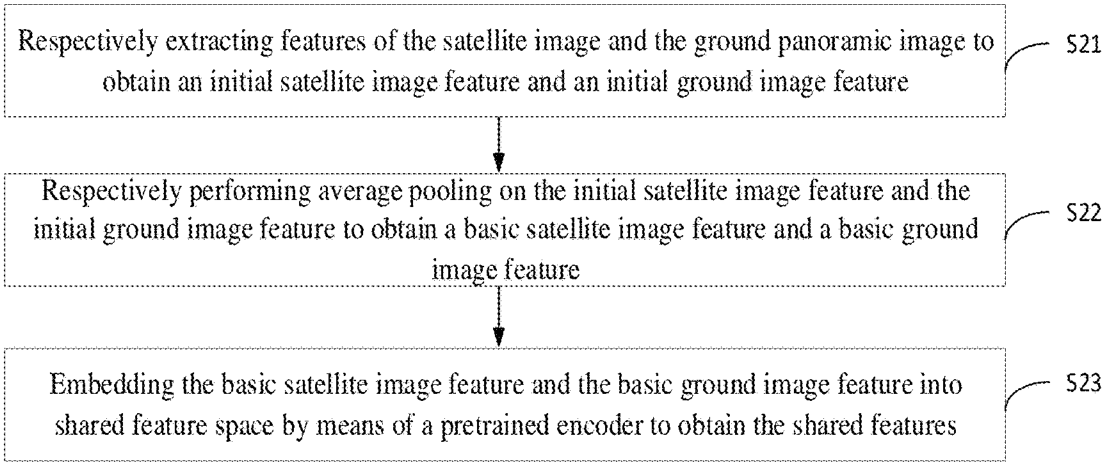
FIG. 2 is an implementation process diagram of a first sub-process of an image generation method based on a Brownian bridge diffusion model provided in an embodiment of the present application.

Refer to FIG. 2, which shows a specific implementation of step S2, detailed description thereof is shown as follows:

- S21: features of the satellite image and the ground panoramic image are respectively extracted to obtain an initial satellite image feature and an initial ground image feature.
- S22: average pooling is respectively performed on the initial satellite image feature and the initial ground image feature to obtain a basic satellite image feature and a basic ground image feature.
- S23: the basic satellite image feature and the basic ground image feature are embedded into shared feature space by means of a pretrained encoder to obtain the shared features.

Specifically, a convolutional neural network is taken as an encoder, and the convolutional neural network can be ConvNeXt-B. The encoder is a pretrained encoder, and the features of the satellite image and the ground panoramic image are respectively extracted by the encoder to obtain the initial satellite image feature and the initial ground image feature. The initial satellite image feature and the initial ground image feature can capture important information such as shapes, textures and colors in the satellite image and the ground panoramic image. Then, in order to remain the most important feature information while reducing the dimensionality of a feature image, average pooling needs to be respectively performed on the initial satellite image feature and the initial ground image feature to obtain the basic satellite image feature and the basic ground image feature. Finally, the basic satellite image feature and the basic ground image feature are embedded into the shared feature space to obtain the shared features.

Figure 3:
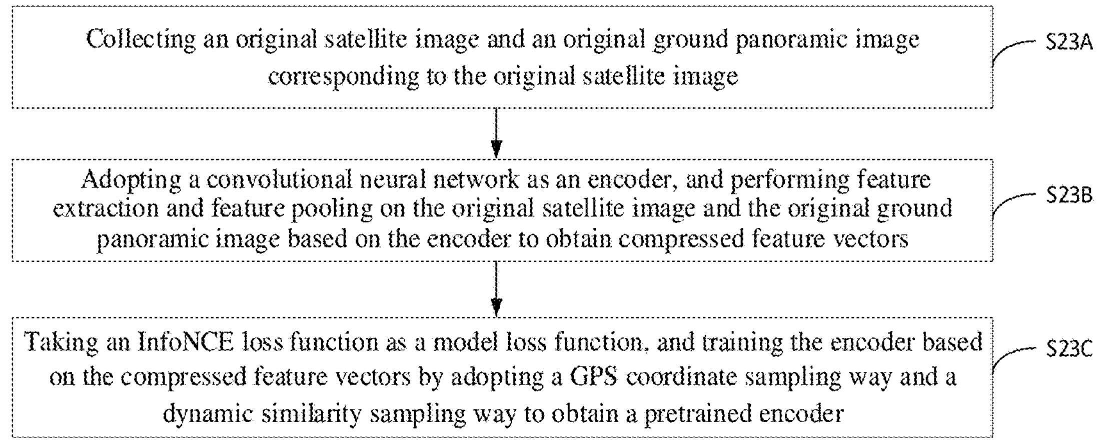
FIG. 3 is an implementation process diagram of a process of an image generation method based on a Brownian bridge diffusion model provided in another embodiment of the present application.

Refer to FIG. 3, which shows a specific implementation before step S23, detailed description thereof is shown as follows:

S23A: an original satellite image and an original ground panoramic image corresponding to the original satellite image are collected.

S23B: a convolutional neural network is taken as an encoder, and feature extraction and feature pooling are performed on the original satellite image and the original ground panoramic image based on the encoder to obtain compressed feature vectors; and S23C: an InfoNCE loss function is taken as a model loss function, and the encoder is trained based on the compressed feature vectors by adopting a GPS coordinate sampling way and a dynamic similarity sampling way to obtain a pretrained encoder.

Specifically, a set of original satellite image and original ground panoramic image pair is collected, an original feature is obtained by the cross-view image joint encoder, and finally, average pooling on a spatial dimension is performed to obtain the compressed feature vectors. The compressed feature vectors are used for computing the loss and optimizing parameters of the encoder. The InfoNCE loss function is taken as the model loss function, and the encoder is trained based on the compressed feature vectors by adopting the GPS coordinate sampling way and the dynamic similarity sampling way, that is, the similarity between a query image and a reference image is computed by dot product, and the encoder is optimized, so that the similarity between positive sample pairs is higher than the similarity between negative sample pairs. When the training is completed, the pretrained encoder in the embodiment of the present application is obtained.

In the embodiment of the present application, the InfoNCE (Information Noise-Contrastive Estimation) loss function is adopted as the model loss function, which is used for optimizing the model by comparing a small amount of positive and negative sample pairs. In the early stage of a training process, considering that the discriminating ability of the model has not been mature yet, in the embodiment of the present application, images with closer geographic positions are selected as negative samples by adopting the GPS coordinate sampling way. Such a way not only enhances the sensibility of the model to geographic features, but also improves the cognitive ability of the model to geographical proximity. With the deepening of training, the discriminating ability of the model is gradually enhanced. Introduced in the embodiment of the present application is the dynamic similarity sampling way, by which images with high similarity in the feature space are dynamically screened and queried as negative samples in the training process, so that samples which are difficult to distinguish are further mined. The implementation of such a way enables the model to focus more on learning to distinguish subtle visual and geographical features in the later stage of training. By means of particular emphasis on the GPS sampling way in the early stage of training and gradual transition to a dynamic similarity sampling strategy in the later stage, not only is a process for mining samples difficult to mine optimized, but also the discriminating ability of the encoder to a cross-view image feature is significantly improved.

The InfoNCE loss function is a common comparative loss function and is used for training the model so as to distinguish the positive samples from the negative samples. In a task of image matching or feature embedding, InfoNCE can help the model learn more discriminative feature representation. The GPS coordinate sampling way: a corresponding relationship of a geographic position exists between the satellite image and the ground panoramic image, and therefore, the positive sample pairs (image pairs with close geographic positions) and the negative sample pairs (image pairs with farther geographic positions) are sampled by means of GPS coordinates. Such a way is beneficial for the model to learn features related to the geographic positions. The dynamic similarity sampling way: the negative samples are dynamically sampled according to similarity between the feature vectors. Specifically, for each positive sample pair, other images more similar to the feature vectors of the positive samples can be selected as the negative samples from a database, so that the training difficulty and the generalization ability of the model are improved.

Training process: in the training process, the encoder will continuously adjust the parameters thereof according to the feedback of the InfoNCE loss function so as to minimize a feature distance between the positive sample pairs and maximize a feature distance between the negative sample pairs. In such a way, the encoder can learn more effective feature representation and embed the features of the satellite image and the ground panoramic image into the same shared feature space.

In the embodiment of the present application, the pretrained encoder is obtained after being trained, and the encoder can convert the original satellite image and the ground panoramic image into the compressed feature vectors in the same feature space.

S3: a polar coordinate transformation is performed on the satellite image, and the satellite image subjected to the polar coordinate transformation and the ground panoramic image are encoded to a latent space to obtain an initial latent vector of the satellite image and a latent vector of the ground panoramic image.

Specifically, the object of the polar coordinate transformation for the satellite image is to partially bridge a view difference of the satellite image and the ground panoramic image, so that the satellite image and the ground panoramic image are closer in geometric structure and provide convenience for subsequent processing. Then, the satellite image subjected to the polar coordinate transformation and the ground panoramic image are encoded to the latent space to obtain the initial latent vector of the satellite image and the latent vector of the ground panoramic image.

The high training cost and the consumption of a video memory will be brought by training the diffusion model in a pixel space. Therefore, in the embodiment of the present application, the satellite image subjected to the polar coordinate transformation and the ground panoramic image are encoded to the latent space by an encoder of a VQGAN (Vector Quantised Generative Adversarial Network) model to obtain the latent vector. The ground panoramic image is a real ground panoramic image. The latent space can be regarded as a compressed pixel space, for example, a 256×256×3 image can be encoded into 64×64×3. Encoding and decoding processes of the VQGAN model can ensure the authenticity of the images well, which is beneficial to the improvement of the image conversion quality. The images are encoded to the latent space, which reduces the data dimensionality, reduces the training cost and the consumption of the video memory, and is beneficial to the efficiency increase of conversion from the satellite image to the panoramic image.

S4: in the latent space, a Brownian bridge forward process is performed based on the initial latent vector of the satellite image and the latent vector of the ground panoramic image to gradually add noise into the latent vector of the ground panoramic image to obtain a latent vector of the satellite image.

Specifically, fixed mapping from a ground panoramic image domain to a satellite image domain is constructed with a latent vector of the real ground panoramic image as a starting point. In the latent space, the conversion from the latent vector of the ground panoramic image to the latent vector of the satellite image is simulated by gradually adding the noise into the latent vector of the ground panoramic image in a forward diffusion process, and if the current latent vector of the ground panoramic image reaches the latent vector of the satellite image, the noise is added no longer, and the latent vector of the ground panoramic image at the moment is used as the latent vector of the satellite image. In this process, a real noise label can be computed for the subsequent Brownian bridge reverse process to guide a training process.

The Brownian bridge forward process is that a process of conversion to a target domain (such as the satellite image domain) is simulated by means of gradual addition of the noise or conversion in other forms starting from a given starting point (such as the latent vector of the real ground panoramic image) in the latent space. This process aims at maintaining or emphasizing the common feature or structure between the two image domains while simulating natural transition of an image from one representation form to another representation form in the latent space.

Figure 4:
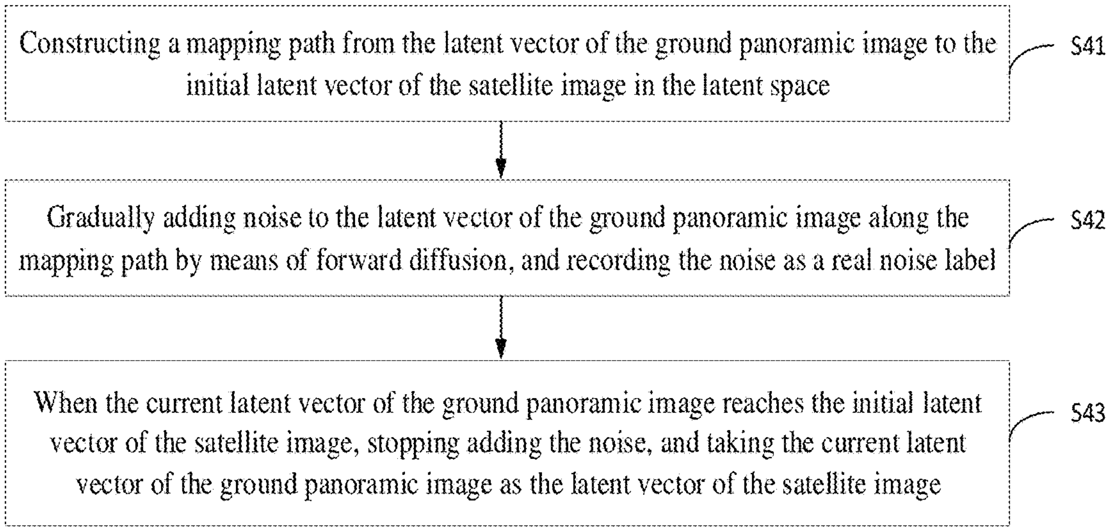
FIG. 4 is an implementation process diagram of a second sub-process of an image generation method based on a Brownian bridge diffusion model provided in an embodiment of the present application.

Refer to FIG. 4, which shows a specific implementation of step S4, detailed description thereof is shown as follows:

S41: a mapping path from the latent vector of the ground panoramic image to the initial latent vector of the satellite image is constructed in the latent space.

S42: noise gradually added to the latent vector of the ground panoramic image along the mapping path by means of forward diffusion, and the noise is recorded as a real noise label.

S43: when the current latent vector of the ground panoramic image reaches the initial latent vector of the satellite image, adding the noise is stopped, and the current latent vector of the ground panoramic image is taken as the latent vector of the satellite image.

Specifically, the mapping path from the latent vector of the ground panoramic image to the initial latent vector of the satellite image is constructed in the latent space; and the noise is gradually added to the latent vector of the ground panoramic image along the mapping path. The process of adding the noise is controllable and follows certain noise distribution (such as Gaussian noise), and the intensity and type of the noise can be gradually changed with a conversion process. The addition of the noise is a key step of simulating image quality degradation. By gradually adding the noise, a process of conversion from high quality (the ground panoramic image) to low quality (the satellite image) can be simulated. After each step that the noise is added, a corresponding real noise label will be generated. The real noise label records specific information (such as the type, intensity and distribution of the noise) of the noise added to the latent vector in the current step. The real noise label is crucial for the subsequent Brownian bridge reverse process, because they will serve as real noise information to guide noise removal in the reverse process. Next, noise addition and noise label generation steps are repeated until the current latent vector of the ground panoramic image reaches the latent vector of the satellite image, adding the noise is stopped, and the current latent vector of the ground panoramic image is taken as the latent vector of the satellite image.

An iteration process of noise addition needs to be performed repeatedly, and the specific number of times of iteration depends on the complexity of a mapping relationship and a strategy of noise addition.

In the embodiment of the present application, in the Brownian bridge forward process, the mapping from the latent vector of the real ground panoramic image to the latent vector of the satellite image is achieved, and the real noise label used for guiding the subsequent reverse process is generated. This process is an important link in image generation and conversion tasks and is beneficial to the simulation of a gradual degradation process of image quality in the latent space.

S5: a Brownian bridge reverse process is performed based on the latent vector of the satellite image and the shared features to gradually remove the noise in the latent vector of the satellite image to generate a target latent vector.

Specifically, the Brownian bridge reverse process is performed based on the latent vector of the satellite image and the shared features, and thus, the noise in the latent vector of the satellite image is gradually predicted and removed by taking the latent vector of the satellite image as a starting point to obtain the target latent vector. In the embodiment of the present application, an attention mechanism is introduced to in the process of performing the Brownian bridge reverse process, and the shared features of the cross-view images are injected by means of a cross attention mechanism. In the cross attention mechanism, the latent vector in the Brownian bridge reverse process is used as a query vector, shared feature vectors extracted by the cross-view image joint encoder are used as a key vector and a value vector, and scaled dot-product attention is used for computation. Due to the introduction of the cross attention mechanism, high-dimensional cross-view image information existing in the shared features can be extracted according to the latent process in the generation process, and thus, the semantic consistency and fidelity of the ground panoramic image and the satellite image are improved.

The Brownian bridge reverse process refers to a process of starting from the latent vector of the satellite image, gradually predicting and removing the noise added in the forward process by means of a series of well-designed transformations or network layers to gradually approach to and generate a latent vector of a target-domain image (such as the ground panoramic image). This process usually corresponds to the Brownian bridge forward process, the loss of the image information is simulated by adding the noise in the forward process, and people try to recover the information in the reverse process.

Figure 5:
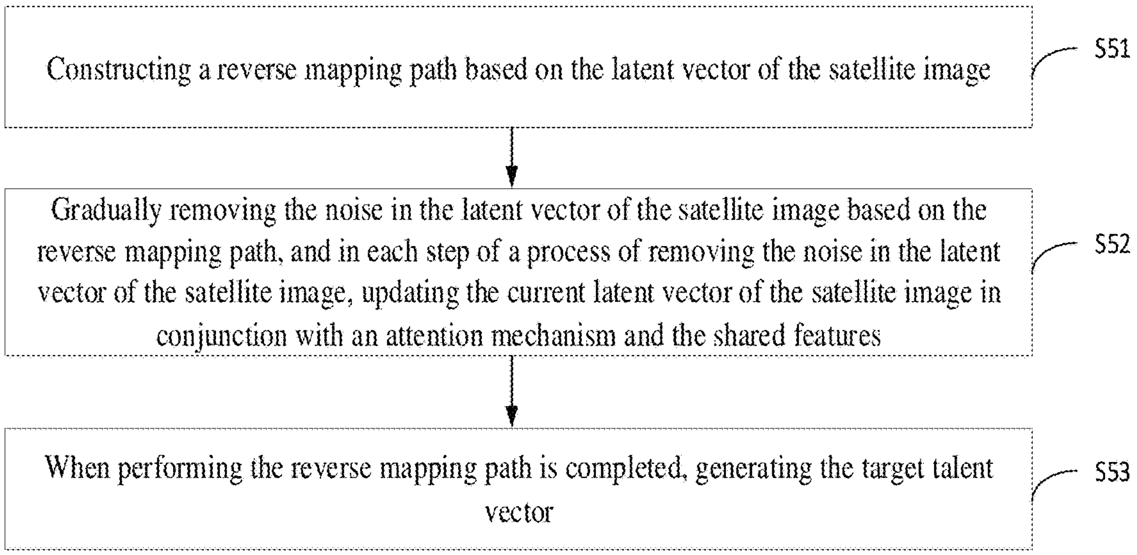
FIG. 5 is an implementation process diagram of a third sub-process of an image generation method based on a Brownian bridge diffusion model provided in an embodiment of the present application.

Refer to FIG. 5, which shows a specific implementation of step S5, detailed description thereof is shown as follows:

S51: a reverse mapping path is constructed based on the latent vector of the satellite image.

S52: the noise in the latent vector of the satellite image is gradually moved based on the reverse mapping path, and in each step of a process of removing the noise in the latent vector of the satellite image, the current latent vector of the satellite image is updated in conjunction with an attention mechanism and the shared features.

S53: when performing the reverse mapping path is completed, the target latent vector is generated.

Specifically, the reverse mapping path opposite to that of the Brownian bridge forward process is constructed in the latent space. The latent vector of the satellite image and the latent vector of the ground panoramic image are connected on the reverse mapping path, and a path for noise removal is specified. Starting from the latent vector of the satellite image, the noise added before is gradually removed along the reverse mapping path. The noise removal process is controllable and follows steps opposite to those of a noise addition process. During each step that the noise is removed, a part of the noise is predicted and removed in conjunction with the attention mechanism according to the state of the current latent vector and information of the latent vector of the ground panoramic image. The cross attention mechanism is introduced to enhance the semantic consistency and fidelity of the generated images. The cross attention mechanism allows the shared features attracting the attention of the latent vectors in the generation process and extracted by means of the cross-view image joint encoder. These shared features include key information between the satellite image and the ground panoramic image, and the latent vectors in the generation process can generate a more accurate and realer ground panoramic image by making full use of the information by means of the cross attention mechanism.

Figure 6:
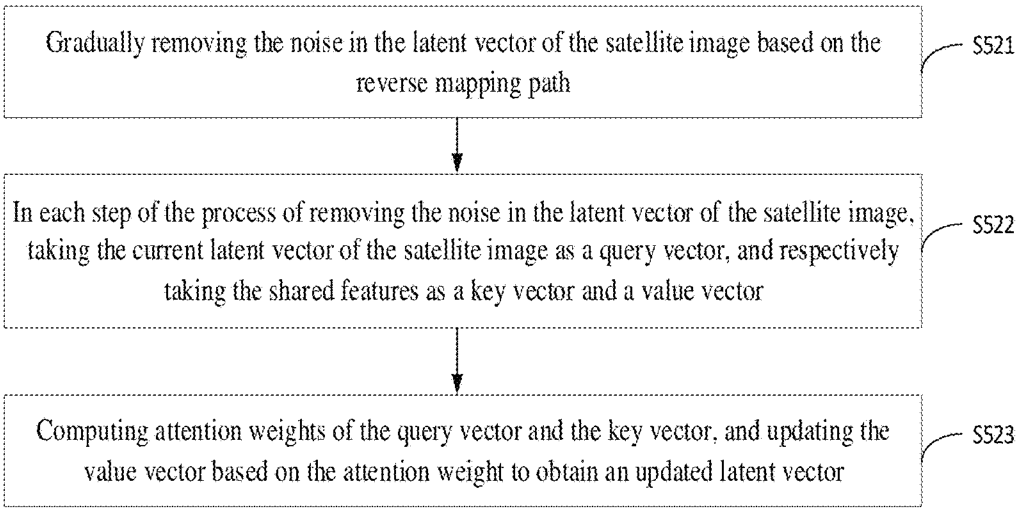
FIG. 6 is an implementation process diagram of a fourth sub-process of an image generation method based on a Brownian bridge diffusion model provided in an embodiment of the present application.

Refer to FIG. 6, which shows a specific implementation of step S52, detailed description thereof is shown as follows:

S521: the noise in the latent vector of the satellite image is gradually removed based on the reverse mapping path.

S522: in each step of the process of removing the noise in the latent vector of the satellite image, the current latent vector of the satellite image is taken as a query vector, and the shared features are respectively taken as a key vector and a value vector.

S523: attention weights of the query vector and the key vector are computed, and the value vector is updated based on the attention weight to obtain an updated latent vector.

Specifically, the noise in the latent vector of the satellite image is gradually removed based on the reverse mapping path; moreover, in each step of the process of removing the noise in the latent vector of the satellite image, the current latent vector of the satellite image is taken as the query vector, and the shared features are respectively taken as the key vector and the value vector; and the attention weights of the query vector and the key vector are computed, and the value vector is updated based on the attention weight to obtain the updated latent vector. The cross attention mechanism is introduced to enhance the semantic consistency and fidelity of the generated images.

Figure 7:
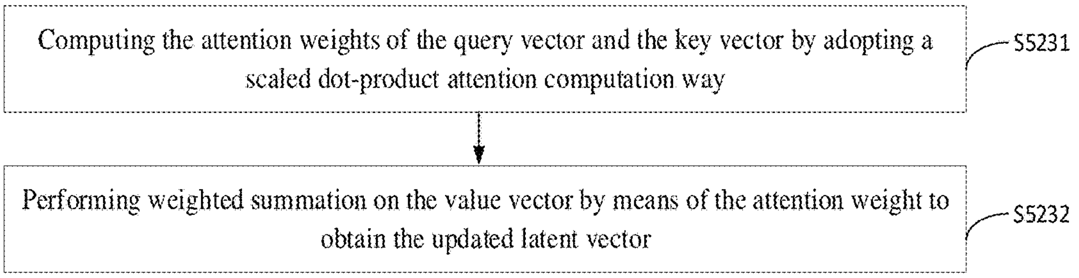
FIG. 7 is an implementation process diagram of a fifth sub-process of an image generation method based on a Brownian bridge diffusion model provided in an embodiment of the present application.

Refer to FIG. 7, which shows a specific implementation of step S523, detailed description thereof is shown as follows:

S5231: the attention weights of the query vector and the key vector are computed by adopting a scaled dot-product attention computation way.

S5232: weighted summation is performed on the value vector by means of the attention weight to obtain the updated latent vector.

Specifically, the attention weights are computed by adopting the scaled dot-product attention computation way. The core of this way lies in that the similarity between the query vector and the key vector is evaluated by a dot product of the query vector and the key vector. However, in order to prevent a Softmax function from entering a gradient-disappearing area due to an overlarge dot-product result, the dot-product result will be scaled in the embodiment of the present application, and thus, the attention weights are obtained. Then, the weighted summation is performed on the value vector by means of the attention weight to obtain the updated latent vector.

S6: the target latent vector is decoded to generate a target ground panoramic image.

Specifically, the target latent vector corresponding to the ground panoramic image has been generated in the above-mentioned step. In the embodiment of the present application, the target latent vector in the latent space is decoded back to an image space by using a decoder of a VQGAN model to generate the target ground panoramic image. The target ground panoramic image maintains the consistent semantics with the input satellite image and has rich details and an accurate structure at the same time.

In the embodiment of the present application, a set of image combination is received, wherein the image combination includes a satellite image and a ground panoramic image corresponding to the satellite image; shared features of the satellite image and the ground panoramic image are extracted by means of a cross-view image joint encoder; a polar coordinate transformation is performed on the satellite image, and the satellite image subjected to the polar coordinate transformation and the ground panoramic image are encoded to a latent space to obtain an initial latent vector of the satellite image and a latent vector of the ground panoramic image; in the latent space, a Brownian bridge forward process is performed based on the initial latent vector of the satellite image and the latent vector of the ground panoramic image to gradually add noise into the latent vector of the ground panoramic image to obtain a latent vector of the satellite image; a Brownian bridge reverse process is performed based on the latent vector of the satellite image and the shared features to gradually remove the noise in the latent vector of the satellite image to generate a target latent vector; and the target latent vector is decoded to generate a target ground panoramic image. In the embodiment of the present invention, the shared features of the satellite image and the ground panoramic image are extracted by means of the cross-view image joint encoder, and the Brownian bridge forward process and the Brownian bridge reverse process are performed, at the same time, the shared features are injected to the Brownian bridge reverse process, which is beneficial to the generation of the ground panoramic image with rich details and an accurate structure from the satellite image, and improves the fidelity and semantic consistency of the images. Moreover, in the embodiment of the present application, the Brownian bridge forward process and the Brownian bridge reverse process are further performed in the latent space, which reduces the model training and reasoning costs and increases the image conversion efficiency.

In the embodiment of the present application, the process of conversion from the satellite image to the ground panoramic image is modeled by applying the Brownian bridge diffusion model, and the conversion between the two domains is directly learned by means of a bidirectional diffusion process, so that the ground panoramic image with the rich details and the accurate structure is directly generated from the satellite image, and the fidelity and semantic consistency of the images are significantly improved. In the embodiment of the present application, the generated images generate fewer artifacts and blurs due to the characteristic of gradual generation of the diffusion model. In the embodiment of the present application, shared information of cross-view image pairs is extracted as a generation clue by means of the cross-view image joint encoder, so that the semantic consistency of the generated ground panoramic image and the corresponding satellite image is effectively improved.

Figure 8:
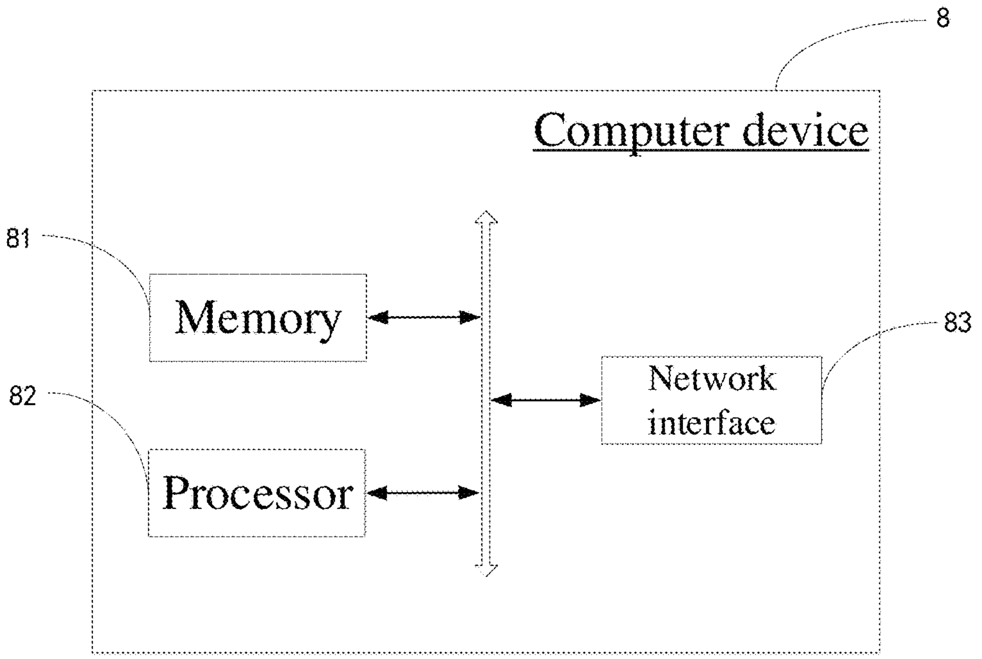
FIG. 8 is a schematic diagram of a computer device provided in an embodiment of the present application.

In order to solve the above-mentioned technical problem, an embodiment of the present application further provides a computer device. Specifically refer to FIG. 8 which is a basic structural block diagram of a computer device in the present embodiment.

The computer device 8 includes a memory 81, a processor 82 and a network interface 83 which are in communication connection by means of a system bus. It should be indicated that FIG. 8 only shows the computer device 8 provided with the three components including the memory 81, the processor 82 and the network interface 83. However, it should be understood that the implementation of all shown components is not required, and more or fewer components can be implemented alternatively. It can be understood by the skilled in the art that the computer device described herein is a device capable of automatically performing numerical computation and/or information processing according to an instruction set or stored in advance, and hardware of the computer device includes, but is not limited to a microcontroller, an Application Specific Integrated Circuit (ASIC), a Field-Programmable Gate Array (FPGA), a Digital Signal Processor (DSP), an embedded device, etc.

The computer device can be a computing device such as a desktop computer, a laptop, a handheld computer and a cloud server. Human-computer interaction between the computer device and a user can be achieved by means of a keyboard, a mouse, a remote controller, a touchpad or a sound-controlled device.

The memory 81 at least includes one type of readable storage medium, and the readable storage medium includes a flash memory, a hard disk, a multimedia card, a card memory (such as an SD or a DX memory), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, an optical disk, etc. In some embodiments, the memory 81 can be an internal storage unit of the computer device 8, such as a hard disk or an internal memory of the computer device 8. In some other embodiments, the memory 81 can also be an external storage device of the computer device 8, such as a plug-in hard disk, a Smart Media Card (SMC), a Secure Digital (SD) card and a Flash Card which are equipped on the computer device 8. Of course, the memory 81 can also include both the internal storage unit and the external storage device of the computer device 8. In the present embodiment, the memory 81 is usually used for storing operating systems and various kinds of application software installed on the computer device 8, such as program codes used in the image generation method based on the Brownian bridge diffusion model. In addition, the memory 81 can be further used for temporarily storing various data which has been output or is to be output.

The processor 82 can be a Central Processing Unit (CPU), a controller, a microcontroller, a microprocessor or other data processing chips in some embodiments. The processor 82 is usually used for controlling the overall operation of the computer device 8. In the present embodiment, the processor 82 is used for running program codes or processed data stored in the memory 81, such as the program codes used in the above-mentioned image generation method based on the Brownian bridge diffusion model, so that various embodiments of the image generation method based on the Brownian bridge diffusion model are achieved.

The network interface 83 can include a wireless network interface or a wired network interface, and the network interface 83 is usually used for establishing a communication connection between the computer device 8 and other electronic devices.

The present application further provides another implementation, that is, provided is a computer-readable storage medium, wherein the computer-readable storage medium has a computer program stored thereon, and the computer program can be executed by at least one processor, so that the at least one processor performs the steps of the above-mentioned image generation method based on the Brownian bridge diffusion model.

By means of the description in above implementations, it can be clearly known by the skilled in the art that the method in the above-mentioned embodiment can be achieved by means of software and an essential universal hardware platform, of course, they can also be achieved by means of hardware, however, in many cases, the former is the better implementation. Based on such understanding, the essences of the technical solutions of the present application or parts thereof making contributions to the prior art can be embodied in a form of a software product, and the computer software product is stored in a storage medium (such as an ROM/RAM, a diskette and an optical disk), and includes a plurality of instructions used for enabling a terminal device (which can be a mobile phone, a computer, a server, an air conditioner or a network device, etc.) to perform the method in each of the embodiments of the present application.

Apparently, the embodiments described above are only a part of the embodiments of the present application, not all the embodiments. Preferred embodiments of the present application are given in the accompanying drawings, but they are not intended to limit the patent scope of the present application. The present application can be embodied in various different forms. Conversely, these embodiments are provided for more thoroughly and comprehensively understanding contents disclosed in the present application. Although the present application has been described in detail with reference to the aforementioned embodiments, the skill in the art can still modify the technical solutions recorded in each of the aforementioned specific implementations or equivalently substitute parts of technical features therein. Any equivalent structures made according to the contents in the description and the accompanying drawings of the present application are directly or indirectly applied to the related art and also fall within the patent protection scope of the present application in a similar way.

The invention claimed is:

1. An image generation method based on a Brownian bridge diffusion model, comprising:

receiving a set of image combination, wherein the image combination comprises a satellite image and a ground panoramic image corresponding to the satellite image;

extracting shared features of the satellite image and the ground panoramic image by means of a cross-view image joint encoder;

performing a polar coordinate transformation on the satellite image, and encoding the satellite image subjected to the polar coordinate transformation and the ground panoramic image to a latent space to obtain an initial latent vector of the satellite image and a latent vector of the ground panoramic image;

in the latent space, performing a Brownian bridge forward process based on the initial latent vector of the satellite image and the latent vector of the ground panoramic image to add noise into the latent vector of the ground panoramic image to obtain a latent vector of the satellite image;

performing a Brownian bridge reverse process based on the latent vector of the satellite image and the shared features to remove the noise in the latent vector of the satellite image to generate a target latent vector; and decoding the target latent vector to generate a target ground panoramic image;

wherein the extracting shared features of the satellite image and the ground panoramic image by means of a cross-view image joint encoder comprises:

respectively extracting features of the satellite image and the ground panoramic image to obtain an initial satellite image feature and an initial ground image feature;

respectively performing average pooling on the initial satellite image feature and the initial ground image feature to obtain a basic satellite image feature and a basic ground image feature; and embedding the basic satellite image feature and the basic ground image feature into shared feature space by means of a pretrained encoder to obtain the shared features.

2. The image generation method based on the Brownian bridge diffusion model of claim 1, wherein before the embedding the basic satellite image feature and the basic ground image feature into shared feature space by means of a pretrained encoder to obtain the shared features, the method further comprises:

collecting an original satellite image and an original ground panoramic image corresponding to the original satellite image;

adopting a convolutional neural network as an encoder, and performing feature extraction and feature pooling on the original satellite image and the original ground panoramic image based on the encoder to obtain compressed feature vectors; and taking an InfoNCE loss function as a model loss function, and training the encoder based on the compressed feature vectors by adopting a GPS coordinate sampling way and a dynamic similarity sampling way to obtain the pretrained encoder.

3. The image generation method based on the Brownian bridge diffusion model of claim 1, wherein the in the latent space, performing a Brownian bridge forward process based on the initial latent vector of the satellite image and the latent vector of the ground panoramic image to add noise into the latent vector of the ground panoramic image to obtain a latent vector of the satellite image comprises:

constructing a mapping path from the latent vector of the ground panoramic image to the initial latent vector of the satellite image in the latent space;

adding noise to the latent vector of the ground panoramic image along the mapping path by means of forward diffusion, and recording the noise as a real noise label; and when the current latent vector of the ground panoramic image reaches the initial latent vector of the satellite image, stopping adding the noise, and taking the current latent vector of the ground panoramic image as the latent vector of the satellite image.

4. The image generation method based on the Brownian bridge diffusion model of claim 1, wherein the performing a Brownian bridge reverse process based on the latent vector of the satellite image and the shared features to remove the noise in the latent vector of the satellite image to generate a target latent vector comprises:

constructing a reverse mapping path based on the latent vector of the satellite image;

removing the noise in the latent vector of the satellite image based on the reverse mapping path, and in each step of a process of removing the noise in the latent vector of the satellite image, updating the current latent vector of the satellite image in conjunction with an attention mechanism and the shared features; and when performing the reverse mapping path is completed, generating the target latent vector.

5. The image generation method based on the Brownian bridge diffusion model of claim 4, wherein the removing the noise in the latent vector of the satellite image based on the reverse mapping path, and in each step of a process of removing the noise in the latent vector of the satellite image, updating the current latent vector of the satellite image in conjunction with an attention mechanism and the shared features comprises:

removing the noise in the latent vector of the satellite image based on the reverse mapping path;

in each step of the process of removing the noise in the latent vector of the satellite image, taking the current latent vector of the satellite image as a query vector, and respectively taking the shared features as a key vector and a value vector; and computing attention weights of the query vector and the key vector, and updating the value vector based on the attention weight to obtain an updated latent vector.

6. The image generation method based on the Brownian bridge diffusion model of claim 5, wherein the computing attention weights of the query vector and the key vector, and updating the value vector based on the attention weights to obtain an updated latent vector comprises:

computing the attention weights of the query vector and the key vector by adopting a scaled dot-product attention computation way; and performing weighted summation on the value vector by means of the attention weight to obtain the updated latent vector.

7. A computer device, comprising a memory and a processor, wherein the memory has a computer program stored thereon, and the processor, when executing the computer program, implements the image generation method based on the Brownian bridge diffusion model of claim 1.

8. A computer device, comprising a memory and a processor, wherein the memory has a computer program stored thereon, and the processor, when executing the computer program, implements the image generation method based on the Brownian bridge diffusion model of claim 2.

9. A computer device, comprising a memory and a processor, wherein the memory has a computer program stored thereon, and the processor, when executing the computer program, implements the image generation method based on the Brownian bridge diffusion model of claim 3.

10. A computer device, comprising a memory and a processor, wherein the memory has a computer program stored thereon, and the processor, when executing the computer program, implements the image generation method based on the Brownian bridge diffusion model of claim 4.

11. A computer device, comprising a memory and a processor, wherein the memory has a computer program stored thereon, and the processor, when executing the computer program, implements the image generation method based on the Brownian bridge diffusion model of claim 5.

12. A computer device, comprising a memory and a processor, wherein the memory has a computer program stored thereon, and the processor, when executing the computer program, implements the image generation method based on the Brownian bridge diffusion model of claim 7.

13. A non-transitory computer-readable storage medium, wherein the computer-readable storage medium has a computer program stored thereon, and the computer program, when executed by a processor, implements the image generation method based on the Brownian bridge diffusion model of claim 1.

14. A non-transitory computer-readable storage medium, wherein the computer-readable storage medium has a computer program stored thereon, and the computer program, when executed by a processor, implements the image generation method based on the Brownian bridge diffusion model of claim 2.

15. A non-transitory computer-readable storage medium, wherein the computer-readable storage medium has a computer program stored thereon, and the computer program, when executed by a processor, implements the image generation method based on the Brownian bridge diffusion model of claim 3.

16. A non-transitory computer-readable storage medium, wherein the computer-readable storage medium has a computer program stored thereon, and the computer program, when executed by a processor, implements the image generation method based on the Brownian bridge diffusion model of claim 4.

17. A non-transitory computer-readable storage medium, wherein the computer-readable storage medium has a computer program stored thereon, and the computer program, when executed by a processor, implements the image generation method based on the Brownian bridge diffusion model of claim 5.

* * * * *